(12) United States Patent
Udagawa et al.

(10) Patent No.: US 6,346,999 B1
(45) Date of Patent: Feb. 12, 2002

(54) IMAGE PICKUP APPARATUS

(75) Inventors: Yoshiro Udagawa, Miyashiro-machi; Masao Suzuki, Tokyo; Nobuhiro Takeda, Kawasaki; Takao Sasakura, Yokohama; Ryoji Kubo, Funabashi; Hideaki Yamaki, Tokyo; Shingo Tatsumi, Kawasaki; Masato Ikeda, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/022,981

(22) Filed: Feb. 12, 1998

(30) Foreign Application Priority Data

Feb. 14, 1997 (JP) .............................. 9-030287
Jul. 4, 1997 (JP) .............................. 9-179565

(51) Int. Cl.$^7$ .............................. H04N 1/46; H04N 9/68; G03F 3/08
(52) U.S. Cl. .................. 358/520; 358/512; 358/515; 348/234
(58) Field of Search ................. 358/512, 515, 358/520; 348/234–238, 262, 264, 273–275, 278–281, 663, 666

(56) References Cited

U.S. PATENT DOCUMENTS

| 5,253,041 A | * | 10/1993 | Wine et al. ................. 348/448 |
| 5,477,260 A | | 12/1995 | Suzuki et al. ............... 348/257 |
| 5,508,741 A | * | 4/1996 | Hieda ......................... 348/252 |
| 5,541,648 A | | 7/1996 | Udagawa et al. ........... 348/222 |
| 5,592,304 A | | 1/1997 | Udagawa et al. ........... 358/444 |
| 5,737,017 A | | 4/1998 | Udagawa et al. ........... 348/280 |
| 5,745,171 A | * | 4/1998 | Ogawa et al. .............. 348/234 |
| 5,945,977 A | * | 8/1999 | Nishiwaki ................... 348/235 |

* cited by examiner

*Primary Examiner*—Kimberly A. Williams
(74) *Attorney, Agent, or Firm*—Fitzpatrick, Cella, Harper & Scinto

(57) ABSTRACT

An image pickup apparatus is provided which can obtain a high image quality by using a camera with a conventional field read type DSP. The image pickup apparatus has an image pickup element having a plurality of color filters disposed in a predetermined layout at respective pixel positions, a calculating and processing unit for performing calculation and processing by using two sets of adjacent pixel data in the vertical direction, at each line of image data generated by the image pickup element, and a luminance signal generating unit for generating a luminance signal by using an output of the calculating and processing unit.

25 Claims, 12 Drawing Sheets

FIG. 1A

|   | 1 | 2 | 3 | 4 |
|---|---|---|---|---|
| 1 | C | Y | C | Y |
| 2 | M | G | M | G |
| 3 | C | Y | C | Y |
| 4 | G | M | G | M |
| 5 | C | Y | C | Y |
|   | M | G | M | G |
|   | C | Y | C | Y |
|   | G | M | G | M |

FIG. 1B

|     | 1 | 2 | 3 | 4 |
|---|---|---|---|---|
| 1+2 | Wb<br>C11+M12 | Gr<br>Y21+G22 | Wb<br>C31+M32 | Gr<br>Y41+G42 |
| 2+3 | Wb<br>C13+M12 | Gr<br>Y23+G22 | Wb<br>C33+M32 | Gr<br>Y43+G42 |
| 3+4 | Gb<br>C13+G14 | Wr<br>Y23+M24 | Gb<br>C33+G34 | Wr<br>Y43+M44 |
| 4+5 | Gb<br>C15+G14 | Wr<br>Y25+M24 | Gb<br>C35+G34 | Wr<br>Y45+M44 |

FOR GENERATION OF LUMINANCE SIGNAL

FIG. 2A

|  | 1 | 2 | 3 | 4 |
|---|---|---|---|---|
| 1+2 | Wb C11+M12 | Gr Y21+G22 | Wb C31+M32 | Gr Y41+G42 |
| 3+4 | Gb C13+G14 | Wr Y23+M24 | Gb C33+G34 | Wr Y43+M44 |

FOR GENERATION OF CHROMINANCE SIGNAL (ODD)

FIG. 2B

|  | 1 | 2 | 3 | 4 |
|---|---|---|---|---|
| 2+3 | Wb C13+M12 | Gr Y23+G22 | Wb C33+M32 | Gr Y43+G42 |
| 4+5 | Gb C15+G14 | Wr Y25+M24 | Gb C35+G34 | Wr Y45+M44 |

FOR GENERATION OF CHROMINANCE SIGNAL (EVEN)

FIG. 3

|   | 1 | 2 | 3 | 4 |
|---|---|---|---|---|
| 1 | C | Y | C | Y |
| 2 | M | G | M | G |
| 3 | Y | C | Y | C |
| 4 | G | M | G | M |
| 5 | C | Y | C | Y |
| 6 | G | M | G | M |
| 7 | Y | C | Y | C |
| 8 | M | G | M | G |

FIG. 4

|  | 1 | 2 | 3 | 4 |
|---|---|---|---|---|
| 1+2 | Wb<br>C11+M12 | Gr<br>Y21+G22 | Wb<br>C31+M32 | Gb<br>G42+G43 |
| 2+3 | Wr<br>M12+Y13 | Gb<br>G22+C23 | Wr<br>M32+Y33 | Wb<br>C43+M44 |
| 3+4 | Gr<br>Y13+G14 | Wb<br>C23+M24 | Gr<br>Y33+G34 | Wb<br>C43+M44 |
| 4+5 | Gb<br>G14+C15 | Wr<br>M24+Y25 | Gb<br>G34+C35 | Wr<br>M44+Y45 |
| 5+6 | Gb<br>C15+G16 | Gr<br>Y25+M26 | Gb<br>C35+G36 | Gr<br>M46+C47 |
| 6+7 | Gr<br>G16+Y17 | Gr<br>M26+C27 | Gr<br>G36+Y37 | Wr<br>C47+G48 |
| 7+8 | Wr<br>Y17+M18 | Wr<br>C27+G28 | Wr<br>Y37+M38 | Wr<br>C47+G48 |
| 8+9 | Wb<br>M18+C19 | wr<br>G28+Y29 | Wb<br>M38+C39 | Wr<br>G48+Y49 |

FOR GENERATION OF LUMINANCE SIGNAL

FIG. 5

| | 1 | 2 | 3 | 4 |
|---|---|---|---|---|
| 1+2 | | Gr<br>Y21+G22 | Wb<br>C31+M32 | |
| 2+3 | | Wr<br>(M12+M32<br>+Y13+Y33)<br>/2 | Gb<br>(G22+G42<br>+C23+C43)<br>/2 | |
| 3+4 | | Gr<br>(Y13+Y33<br>+G14+G34)<br>/2 | Wb<br>(C22+C42<br>+M22+M42)<br>/2 | |
| 4+5 | | Wr<br>M24+Y25 | Gb<br>G34+C35 | |
| 5+6 | | Gr<br>(2*Y25<br>+G16+G36)<br>/2 | Wb<br>(2*C35<br>+M26+M46)<br>/2 | |
| 6+7 | | Wr<br>(2*M26<br>+Y17+Y37)<br>/2 | Gb<br>(2*G36<br>+C27+C47)<br>/2 | |
| 7+8 | | Gr<br>(Y17+Y37<br>+2*G28)<br>/2 | Wb<br>(C27+C47<br>+2*M38)<br>/2 | |
| 8+9 | | Wr<br>(M18+M38<br>+2*Y29)<br>/2 | Gb<br>(G28+G48<br>+2*C39)<br>/2 | |
| | | FOR GENERATION OF CHROMINANCE SIGNAL | | |

FIG. 9

| | | | | |
|---|---|---|---|---|
| ODD | Wb | Gr | Wb | Gr |
| EVEN | Wb | Gr | Wb | Gr |
| ODD | Gb | Wr | Gb | Wr |
| EVEN | Gb | Wr | Gb | Wr |
| ODD | Wb | Gr | Wb | Gr |
| EVEN | Wb | Gr | Wb | Gr |
| ODD | Gb | Wr | Gb | Wr |
| EVEN | Gb | Wr | Gb | Wr |

| | | | | |
|---|---|---|---|---|
| ODD | CY | CY | CY | CY |
| EVEN | MG | MG | MG | MG |
| ODD | CY | CY | CY | CY |
| EVEN | MG | MG | MG | MG |
| ODD | CY | CY | CY | CY |
| EVEN | MG | MG | MG | MG |
| ODD | CY | CY | CY | CY |
| EVEN | MG | MG | MG | MG |

FIG. 11A

|  | 1 | 2 | 3 | 4 |
|---|---|---|---|---|
| 1+2 | Wb C11+M12 | Gr Y21+G22 | Wb C31+M32 | Gr Y41+G42 |
| 2+3 | Gb C13+G12 | Wr Y23+M22 | Gb C33+G32 | Wr Y43+M42 |
| 3+4 | Wb C13+M14 | Gr Y23+G24 | Wb C33+M34 | Gr Y43+G44 |
| 4+5 | Gb C15+G14 | Wr Y25+M24 | Gb C35+G34 | Wr Y45+M44 |

FIG. 11B

|  | 1 | 2 | 3 | 4 |
|---|---|---|---|---|
| 4 | C41+Y41 | M42+G42 | C43+Y43 | M44+G44 |
| 3 | C31+Y31 | M32+G32 | C33+Y33 | M34+G34 |
| 2 | C21+Y21 | M22+G22 | C23+Y23 | M24+G24 |
| 1 | C11+Y11 | M12+G12 | C13+Y13 | M14+G14 |

FIG. 12B

| | 1 | | 2 | |
|---|---|---|---|---|
| Wb C11+M12 | Gr Y11+G12 | Wb C21+M22 | Gr Y21+G22 |
| Gb C11+G12 | Wr Y11+M12 | Gb C21+G22 | Wr Y21+M22 |
| Wb C13+M12 | Gr Y13+G12 | Wb C23+M22 | Gr Y23+G22 |
| Gb C13+G12 | Wr Y13+M12 | Gb C23+G22 | Wr Y23+M22 |

| | 1 | 2 | 3 | 4 |
|---|---|---|---|---|
| 1 | CY | CY | CY | CY |
| 2 | MG | MG | MG | MG |
| 3 | CY | CY | CY | CY |
| 4 | MG | MG | MG | MG |
| 5 | CY | CY | CY | CY |

FIG. 13

| C | Y |
|---|---|
| M | G |
| Y | C |
| G | M |
| C | Y |
| G | M |
| Y | C |
| M | G |

FIG. 14

| C | Y |
|---|---|
| M | G |
| C | Y |
| G | M |

FIG. 15

| | | | | |
|---|---|---|---|---|
| ODD | Wb | Gr | Wb | Gr |
| | Wb | Gr | Wb | Gr |
| ODD | Gb | Wr | Gb | Wr |
| | Gb | Wr | Gb | Wr |
| ODD | Wb | Gr | Wb | Gr |
| | Wb | Gr | Wb | Gr |
| ODD | Gb | Wr | Gb | Wr |
| | Gb | Wr | Gb | Wr |

| | | | | |
|---|---|---|---|---|
| | Wb | Gr | Wb | Gr |
| EVEN | Wb | Gr | Wb | Gr |
| | Gb | Wr | Gb | Wr |
| EVEN | Gb | Wr | Gb | Wr |
| | Wb | Gr | Wb | Gr |
| EVEN | Wb | Gr | Wb | Gr |
| | Gb | Wr | Gb | Wr |
| EVEN | Gb | Wr | Gb | Wr |

Wb = C + M

Gr = Y + G

Gb = C + G

Wr = Y + M

IMAGE PICKUP APPARATUS

BACKGROUND OF THE INVENTION

1. Field of the Invention

The present invention relates to an image pickup apparatus using a solid state image pickup element such as CCD, and more particularly to signal processing techniques used by an image pickup apparatus.

2. Related Background Art

In a conventional image pickup apparatus such as a video camera which uses CCD and a digital signal processor adapted for field read-out, the following signal processing has been performed to form one frame of a still image constituted of even and odd fields.

FIG. 14 shows the image pickup plane of a CCD in which cyan (C), yellow (Y), magenta (M) and green (G) color filters are disposed at respective pixel positions.

Image data of one frame picked up with this CCD is stored in a memory and combined as shown in FIG. 15 wherein Wb=C+M, Gr=Y+G, Gb=C+G, and Wr=Y+M. After the image data is combined as shown in FIG. 15, an odd field is first formed and then an even field is formed.

With this signal processing described with FIG. 15, however, since the odd and even fields are sequentially processed, adjacent pixels in the vertical direction in each field are disposed with one pixel being interposed therebetween. Therefore, correlation therebetween is low. Since a luminance signal is generated through calculation of pixels with low correlation, the contour emphasis in the vertical direction is shifted to the low frequency area and false chrominance increases.

SUMMARY OF THE INVENTION

It is an object of the present invention to provide an image pickup apparatus capable of forming high quality images.

In order to achieve the above object of the invention, there is provided an image pickup apparatus which comprises: image pickup means including an image pickup element with a plurality of color filters disposed in a predetermined layout at respective pixel positions; calculating and processing means for performing calculation and processing by using two sets of adjacent image data in the vertical direction, at each line of image data obtained by the image pickup means; and luminance signal generating means for generating a luminance signal in accordance with an output of the calculating and processing means.

It is another object of the present invention to provide an image pickup apparatus capable of forming high quality images with ease by using a signal processing system of a general video camera.

It is a further object of the present invention to provide an image pickup apparatus capable of selectively using different image signal generating methods by using a simple circuit.

It is still another object of the present invention to provide an image pickup apparatus capable of changing a resolution of images to be picked up, by processing image signals with a common signal processing system.

The other objects and features of the present invention will become apparent from the following detailed description of embodiments when read in conjunction with the accompanying drawings.

BRIEF DESCRIPTION OF THE DRAWINGS

FIGS. 1A and 1B are schematic diagrams illustrating a layout of CCD color filters and generation of luminance signals according to an embodiment of the invention.

FIGS. 2A and 2B are schematic diagrams illustrating the generation of chrominance signals.

FIG. 3 is a schematic diagram illustrating a layout of CCD color filters according to another embodiment of the invention.

FIG. 4 is a schematic diagram illustrating the generation of luminance signals.

FIG. 5 is a schematic diagram illustrating the generation of chrominance signals.

FIG. 9 is a schematic diagram illustrating data input to a digital signal processor.

FIG. 10 is a schematic diagram illustrating sampled data in a high resolution mode.

FIGS. 11A and 11B are schematic diagrams illustrating examples of data input to the digital signal processor.

FIGS. 12A and 12B are schematic diagrams illustrating other examples of data input to the digital signal processor.

FIG. 13 is a schematic diagram illustrating a layout of CCD color filters according to another embodiment of the invention.

FIG. 14 is a schematic diagram illustrating a conventional layout of CCD color filters.

FIG. 15 is a schematic diagram illustrating conventional signal processing.

DETAILED DESCRIPTION OF THE PREFERRED EMBODIMENTS

A first embodiment of the invention will be described.

Figure 6:
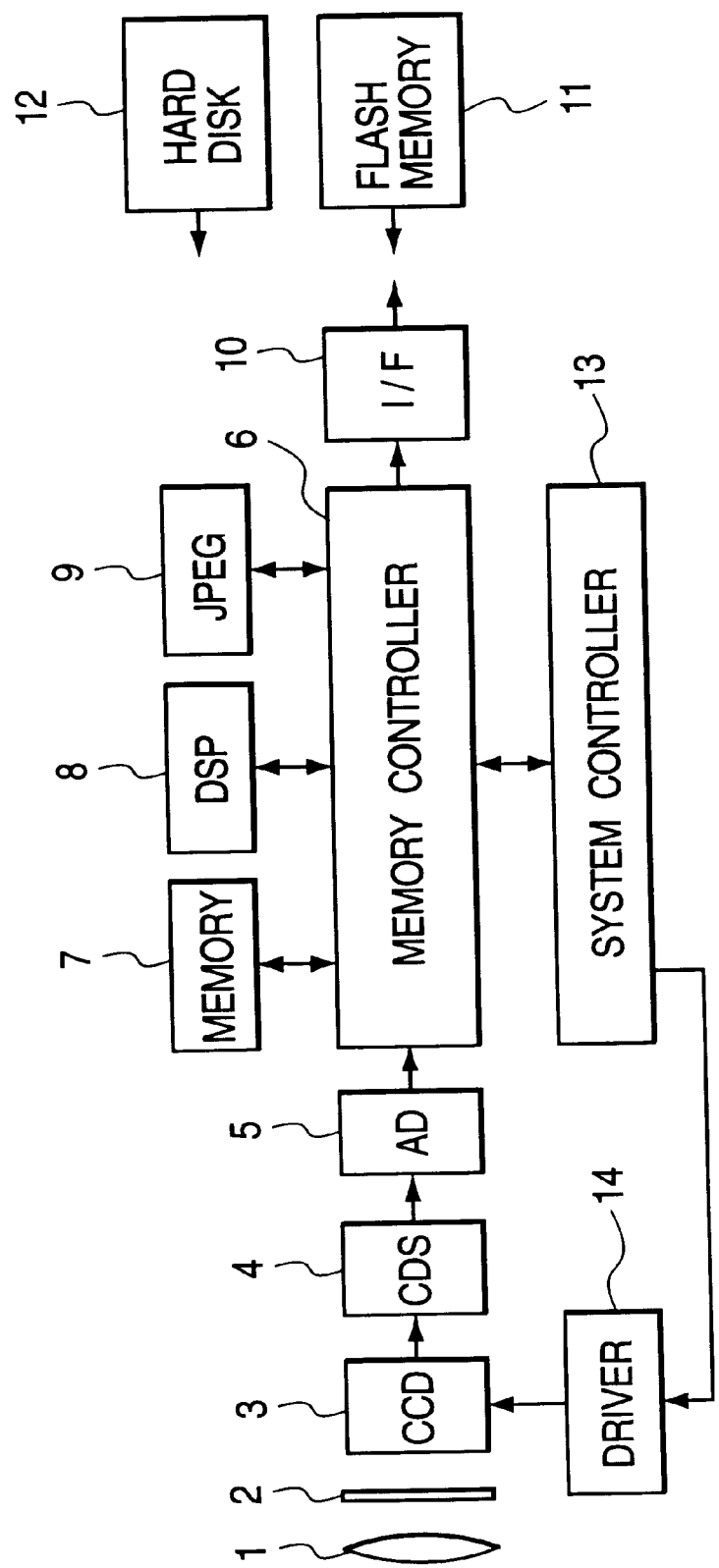
FIG. 6 is a block diagram showing an image pickup apparatus according to an embodiment of the invention.

FIG. 6 is a block diagram showing the structure of a digital still camera embodying the invention.

Referring to FIG. 6, an image of an unrepresented object is focussed on the image pickup plane of a CCD 3 via an optical system 1 and via an optical low-pass filter (LPF). A picked-up image signal photoelectrically converted by CCD 3 as an electrical signal is supplied to a CDS circuit 4 which removes noises and performs other processes. The image signal is thereafter converted into digital image data by an A/D converter 5. This image data of one frame is stored in a memory 7 under the control of a memory controller 6.

The raw data in the memory 7 is converted by the memory controller 6 into a data format in conformity with the specification of DSP (digital signal processor) 8 to be described later, and input to DSP 8 which processes the input data. The processed data is compressed by a JPEG circuit 9 and stored via an I/F 10 into a storage device such as a flash memory 11 or a hard disk 12. A system controller 13 controls the memory controller 6 and a CCD driver 14.

Figure 7:
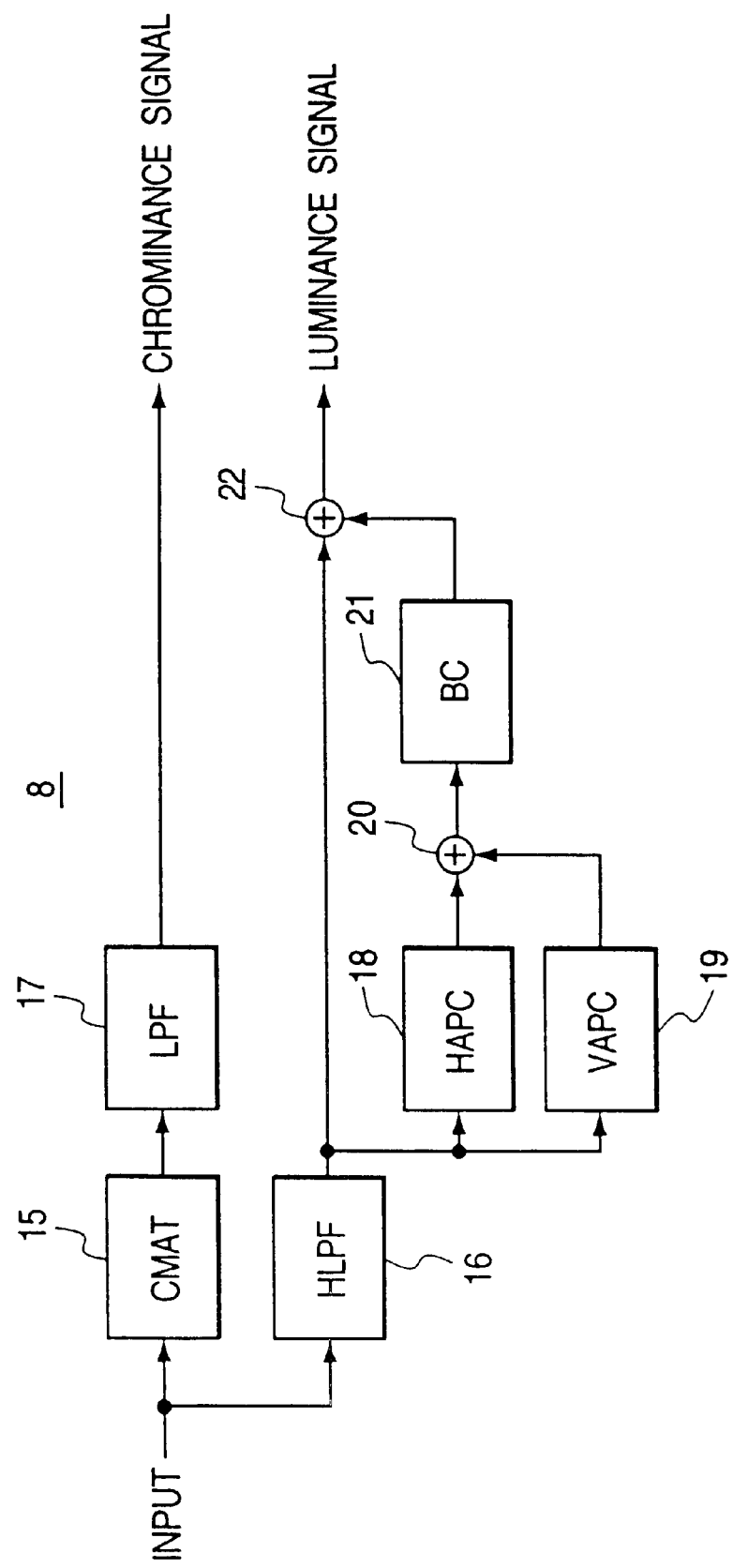
FIG. 7 is a block diagram showing a digital signal processor.

FIG. 7 is a block diagram showing the structure of DSP 8.

The raw data of one frame stored in the memory 7 is converted by the memory controller 6 into a data format in conformity with the specification of DSP 8 and input to DSP 8 shown in FIG. 7. The input data is supplied to a CMAT (chrominance signal processor) 15 and to an HLPF (horizontal low-pass filter) 16. A luminance signal processing is performed by HLPF 16 and by succeeding circuits to be later described.

CMAT 15 first performs a matrix transformation of Wb, Gr, Gb and Wr to generate R, G and B signals which are passed through a LPF 17 to obtain chrominance signals.

In the luminance signal processing, HLPF 16 removes aliasing of chromatic color. Next, an HAPC (horizontal contour emphasizing circuit) 18 and a VAPC (vertical contour emphasizing circuit) 19 generate horizontal and vertical contour emphasis signals which are added by an adder 20 and supplied to a BC (base clip) circuit 21 to clip and remove low level signals. Thereafter, the output from BC 21 is added to a signal output from HLPF 16 by an adder 22 to form a luminance signal.

The luminance and chrominance signals are supplied to the JPEG circuit 9 shown in FIG. 6 whereat they are compressed and then stored in a memory.

Next, a method of converting the raw data of one frame into the data format in conformity with the specification of DSP 8 will be described. FIG. 1A shows the layout of CCD data of one frame. FIG. 1B shows the layout of data used for the generation of luminance signals from the CCD data.

In generating luminance signals, two adjacent signals in the vertical direction in respective lines are added together in a manner like (first line+second line, second line+third line, third line+fourth line, . . . ). Lines having a high correlation are therefore added in the vertical direction.

Since four lines on the CCD plane are required as reference lines to generate the contour emphasis signal in the vertical direction by using the subject line and upper and lower lines, fine control becomes possible. In contrast, in the conventional example shown in FIG. 15, six lines on the CCD plane are required as reference lines to generate the contour emphasis signal in the vertical direction by using the subject line and upper and lower two lines, so that fine contour control in the vertical direction becomes impossible.

FIGS. 2A and 2B illustrate a method of generating data used for the generation of a chrominance signal. Since the order of supplying data to DSP 8 for the generation of a chrominance signal is determined definitely, the chrominance signal is generated basically by a method similar to the conventional method. Specifically, signals are input separately for the odd (refer to FIG. 2A) and even (refer to FIG. 2B) fields in the following manner to generate chrominance signals.

For the odd field, each odd line data is added to the next even line data in the manner like (first line +second line, third line+fourth line, fifth line+sixth line, . . . ), whereas for the even field, each even line data is added to the next odd line data in the manner like (second line+third line, fourth line+fifth line, sixth line+seventh line, . . . ).

Since the order of processing each pixel data of the picked-up image data to generate a luminance signal is different from the order of processing each pixel data of the picked-up image data to generate a chrominance signal, the luminance signal can be generated with higher correlation.

In a second embodiment, the layout of color filters of CCD 3 is different from the first embodiment described above. FIG. 3 shows the layout of color filters of the second embodiment. In this case, even if thinning-out is performed in the vertical direction, chrominance signals can be generated with fidelity similar to the first embodiment.

FIG. 4 illustrates a method of forming a luminance signal by using the filter layout shown in FIG. 3. The luminance signal is generated by adding two pixels in the vertical direction similar to the first embodiment. As different from the interlaced combination as in a conventional example (lower correlation in the vertical direction), pixel addition in the vertical direction is performed with higher correlation similar to the first embodiment. It is therefore possible to reproduce a clear contour in the vertical direction.

FIG. 5 illustrates a method of generating a chrominance signal. In the case of a chrominance signal, it is necessary to input data to DSP 8 in a predetermined combination, and a proper chrominance signal cannot be generated if data is input through simple addition in the vertical direction. To this end, interpolation in the horizontal direction is performed to obtain a proper combination.

For example, a Wr signal at the "second" horizontal pixel and at the "second+third" vertical pixel is generated by adding adjacent M at the second line and adjacent Y at the third line in the horizontal direction, i.e., $Wr=(M12+M32+Y13+Y33)/2$. Similarly, a Gb signal at the "third" horizontal pixel and at the "second+third" vertical pixel is generated by adding adjacent G at the second line and adjacent C at the third line in the horizontal direction, i.e., $Gb=(G22+G42+C23+C43)/2$.

By inputting to DSP 8 the signals with a proper combination obtained by the above interpolation, chrominance signals are generated. Although the bandwidth in the horizontal direction may be lowered more or less by the interpolation process, the bandwidth limit is generally performed at the stage of chrominance signals, this lowered bandwidth does not pose a practical problem. Instead, an S/N may be improved by the addition.

After the luminance and chrominance signals for one frame are time divisionally formed, they are synthesized to generate image data of so-called three-plane image data of R, G and B. If separated luminance and chrominance signals are preferable as in the case of JPEG compression, they may be compressed without being synthesized.

With the above embodiments, images of high quality can be formed. Images of high quality can be generated even with an image pickup apparatus having a conventional digital signal processor of a field read type.

In the following embodiments, the description is directed to high image quality of a solid state image pickup apparatus obtained through pixel shift.

In order to make a solid image pickup apparatus have a high resolution, various methods have been incorporated. For example, with a first method, an image pickup element itself is made to have a number of pixels. With a second method, a number of planes (plurality of image pickup elements) are used. With a third method which is referred to as "a pixel shift method", a light flux incident upon an image pickup element is shifted to obtain the substantial effects same as that the number of pixels of the image pickup element is increased.

The first method depends upon semiconductor fabrication techniques and has a limit in a high resolution. The second method can be relatively easily realized by using optical prisms and the like. However, since a plurality of image pickup elements are used, the cost becomes high. From the reasons described above, the third method using a single plane is becoming popular.

This pixel shift method with a single plane has, however, a practical difficulty in shifting a light flux because color filters are attached to a solid state image pickup element. Further, a large amount of data is required in order to realize a high resolution so that the number of picked-up images is required to be increased in practical use.

Still further, a practical method of processing image data with pixel shift has not been established as yet, and it has took a long time to process such image data.

In view of the above-described problems, the following embodiments provide a solid state image pickup apparatus capable of realizing a high resolution through a pixel shift method with a reduced number of picked-up images and a short signal processing time.

Also in the following embodiments, the relative position of the image pickup element attached with color filters is moved by the amount of one pixel in the horizontal direction to obtain two sets of image data of the same subject focussed by an optical system. Two sets of image data are synthesized into one set of image data to obtain a high resolution. Accordingly, the number of image data sets required for a high resolution can be reduced and a conventional digital signal processor IC can be used.

Figure 8:
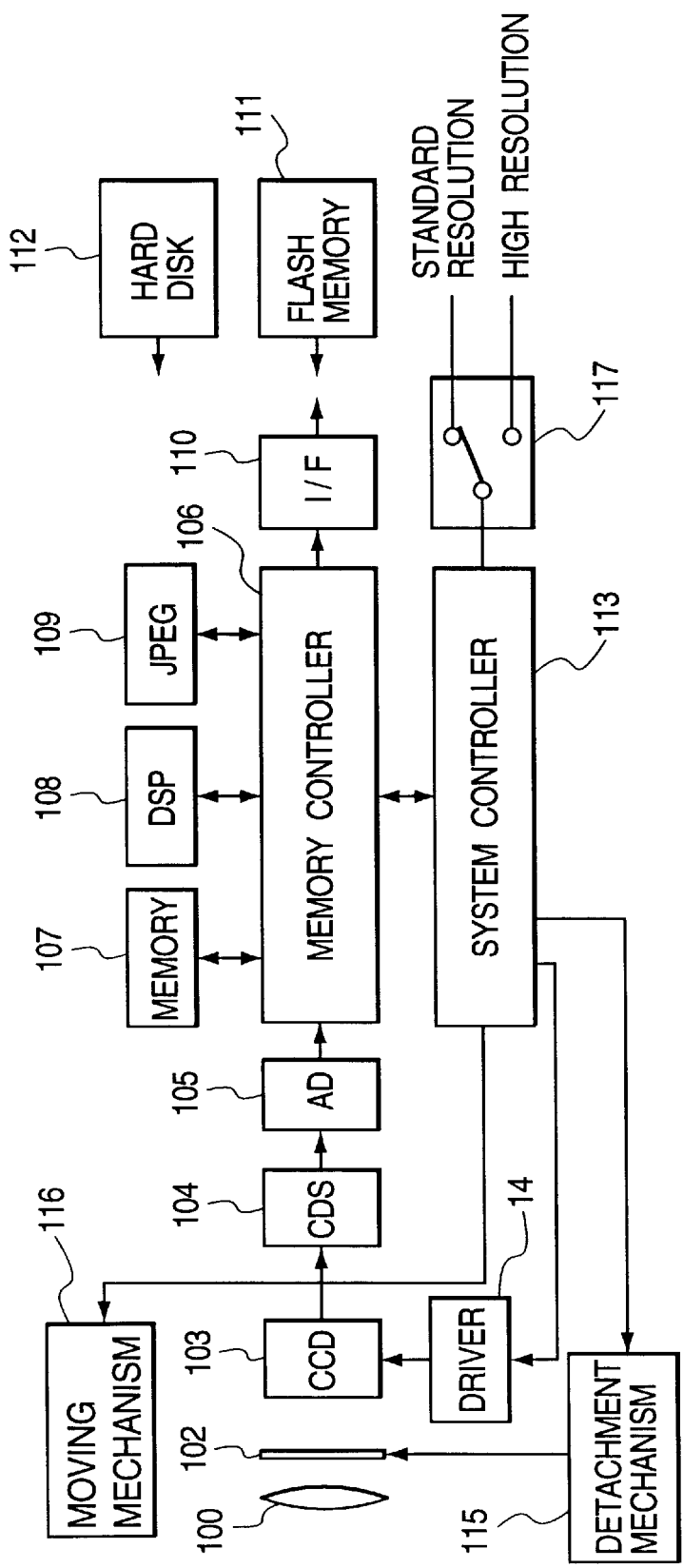
FIG. 8 is a block diagram showing the structure of a solid state image pickup apparatus according to an embodiment of the invention.

A third embodiment will now be described. FIG. 8 is a block diagram showing the structure of a digital still camera system of the third embodiment. The digital still camera system of this embodiment will be described with reference to the accompanying drawings.

An image of an unshown subject is made incident upon the inside of the camera by an optical system 100, and focussed via an optical low-pass filter (LPF) 102 onto the image plane of a CCD 103. CCD 103 photoelectrically converts the focussed image into an electrical signal which is then supplied to a CDS circuit 104 and to an A/D converter 105. The digital image data of one frame output from the A/D converter 106 is stored in a memory 7 under the control of a memory controller 106.

The image data stored in the memory 107 is supplied under the control of the memory controller 106 to a DSP 8 to be subjected to predetermined signal processing, and thereafter compressed by a JPEG compressing circuit 109. The image data is then stored via an I/F 110 in a flash memory 111 or a hard disk 112. A system controller 113 generates a drive signal for driving a CCD driver 114 and controls the memory controller 106.

Switching between resolution modes will be described. First, a standard resolution mode will be described. When a switch SW 117 is set to the standard resolution mode, the system controller 113 drives a detachment mechanism 115 for detaching the optical LPF 102 to thereby insert the optical LPF 102 into the optical path. When an unshown shutter switch SW is turned on, an unshown shutter is opened to start exposure, image pickup and recording operations.

On the other hand, if a high resolution mode is set, the system controller 113 drives the detachment mechanism 115 to retract the optical LPF 102 from the optical path. When the unshown shutter switch SW is turned on, the unshown shutter is opened to take a first image of the subject and store it in the memory 107.

Next, a CCD moving mechanism 116 is driven to move CCD 103 by one pixel amount in the horizontal direction. Similar to the first image, the unshown shutter is opened to form a second image of the subject and store it in the memory 107.

Two images of the subject stored in the memory 107 are subjected to a synthesis process through addition of pixels with changed pixel combinations to thereby form one synthesized image of the subject. This image data is supplied to the JPEG compressing circuit 109 whereat it is compressed. The compressed image data is written in the flash memory 111 or the like via the I/F 110. The image data synthesis process will be later described.

The processed to be executed by DSP 108 will be described. In the third embodiment, color filters shown in FIG. 14 are used. DSP 108 may be a general video DSP which processes signals output from CCD 103 which is driven through field read (vertical two-pixel addition). If CCD of a digital still camera performs field read, the number of pixels in the vertical direction is halved and the resolution is lowered.

In this embodiment, therefore, frame read is performed and image data is stored in the memory 107. Pixel data is added together in a digital manner by changing the combination of pixels, and input to DSP 108. In this manner, a conventional video signal processor can be used with the digital still camera of this embodiment. FIG. 9 shows the layout of combined data input to DSP 108.

FIG. 7 is a block diagram showing an example of DSP 8 of this embodiment. This DSP 8 will be described with reference to FIG. 7.

Combined data disposed in the layout shown in FIG. 9 is input separately for odd and even fields for the signal processing of chrominance C and luminance Y signals. For the chrominance signal processing, Wb, Gr, Gb and Wr signals are supplied to a matrix circuit (CMAT) 15 and converted into R, G and B signals through matrix transformation. Thereafter, these R, G and B signals are passed through a LPF (low-pass filter) 17 to obtain a chrominance signal C.

For the luminance signal processing, an HLPF (horizontal low-pass filter) 16 removes aliasing of chromatic color. Next, an HAPC (horizontal contour emphasizing circuit) 18 and a VAPC (vertical contour emphasizing circuit) 19 generate contour emphasis signals.

The contour emphasis signals are added by an adder 20 and supplied to a BC (base clip) circuit 21 to clip and remove low level signals. Thereafter, the output from BC 21 is added to a signal output from HLPF 16 to form a luminance signal Y. The luminance and chrominance signals are supplied to the JPEG compressing circuit 109 whereat they are compressed and then stored in the storage medium.

Next, the processed to be executed in the high resolution mode will be described. FIG. 10 shows the layout of sampled color data at respective pixel positions obtained from the two images of the subject taken in the above manner.

Specifically, C and Y are sampled at respective pixel positions at odd lines, whereas M and G are sampled at respective pixel positions at even lines. FIGS. 11A and 11B are schematic diagrams showing combinations of sampled data. In FIGS. 11A and 11B, C11 means chrominance signal components at the first horizontal position "1" and first vertical position "1".

First, a method of generating a chrominance signal C will be described. Two methods may be thought of. With a first method, a different combination of pixel data at the same pixel position is used for generating addition signal data as shown in FIG. 11B, whereas with a second method, pixel data at the same pixel position is used for generating addition signal data as shown in FIG. 12A, the latter case being similar to the case wherein one image of a subject is used.

With the first method, therefore, image data of four pixels is generated through addition of image data of each filter obtained by a single pixel shift. The amount of pixel data is doubled both in the horizontal and vertical directions, totaling in a fourfold. After the chrominance signal C is generated, it may be thinned out or may not be thinned out with a fourfold data amount. With the second method, pixel addition is performed obliquely on the memory plane by using a plurality set of pixel data obtained by shifting pixel data from the original pixel positions. In this case, therefore, the data amount does not increase.

Next, the method of generating a luminance signal will be described. Two methods may also be thought of. A first method uses the same combination as the chrominance signal C. The number of horizontal pixels is doubled to lower the above-described influence of luminance upon HLPF and realize a high resolution. A second method uses a combination illustrated in FIG. 12B in which the data layout is reversed in the horizontal and vertical directions.

In the data layout shown in FIG. 12B, the data is repeated in the unit of two pixels in the horizontal direction so that aliasing of luminance can be removed by HLPF. Since LPF is not effective in the vertical direction, data is processed while the broad bandwidth is retained. The layout of processed data is finally reversed in the horizontal and vertical directions to generate a normal luminance signal Y.

If the above operation (reversing the data layout in the horizontal and vertical directions) is not performed, the bandwidth in the horizontal direction cannot be made broad because of the influence of HLPF, and in addition, the response in the vertical direction lowers more than two-pixel addition.

By performing both the above-described luminance and chrominance signal processing, one image data processing is completed. If the method illustrated with FIG. 11B is performed for both the chrominance signal C and luminance signal Y, the same data is input to DSP 8 one time, whereas with the other method, different data is input twice.

Which method is to be selected for processing the luminance signal Y and chrominance signal C depends on an allowable process time. If both signals are processed by the combination method illustrated with FIG. 11B, only a single DSP process is necessary so that a process time is short. If the combination illustrated with FIG. 12B is used for the luminance signal Y, a process time is long. However, in this case, a relatively broad bandwidth can be retained as compared to the method illustrated with FIG. 11B.

A fourth embodiment will be described. In the above embodiment, CCD 103 is moved to shift a relative position between CCD 103 and a subject image by the amount of one pixel. This relative position between CCD and a subject image may be changed by other methods. For example, a parallel plate may be inserted into the optical path to change an incidence angle of a subject image.

The layout of color filters is not limited only to the pattern shown in FIG. 14, but other patterns may also be used. For example, a layout shown in FIG. 13 may also be used. The signal processing method used by DSP 8 may be other methods.

A fifth embodiment will be described.

The present invention may be applied to a system constituted by a plurality of apparatuses (e.g., a host computer, interface units, a reader, a printer, and the like) or to a system constituted by a single apparatus.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program code themselves and means for supplying such program codes to a computer, e.g., a storage medium storing such program codes, constitute the present invention. The storage medium storing such program codes may be a floppy disk, a hard disk, an optical disk, a magneto-optical disk, a CD-ROM, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

According to the above-described embodiments, the image pickup element with color filters attached thereto is moved by the amount of one pixel in the horizontal direction, relative to a subject image focussed on the image pickup element by an optical system, to thereby take two images of the subject which are synthesized into a single image. Accordingly, the number of images required for realizing a high resolution can be reduced.

Signal charges generated by an image pickup element are read for each frame, and this image data is stored in a memory. Through addition of a changed combination of pixel data, image data of two images are synthesized into image data of a single image. Accordingly, image data of a reduced number of images can realize a high resolution and a conventional DSP can be used for signal processing. A conventional signal processing IC can therefore be used and the time and labor required for the developments of new ICs can be dispensed with.

In the first to fifth embodiments described above, image data of each line is generated through addition of two pixels in the vertical direction. Image data of each line may be generated through subtraction, averaging, or realignment which may be selectively used.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   image pickup means including an image pickup element with a plurality of color filters disposed in a predetermined layout at respective pixel positions;
   calculating and processing means for performing calculation and processing on each line of image data obtained by said image pickup means by using image data of two lines adjacent to each other in the vertical direction; and
   luminance signal generating means for generating a luminance signal in accordance with each line of image data output from said calculating and processing means.

2. An image pickup apparatus according to claim 1, wherein the calculating and processing means performs one of addition, subtraction, averaging and realignment.

3. An image pickup apparatus according to claim 1, wherein said luminance signal generating means generates horizontal and vertical contour emphasis signals from an output of said calculating and processing means and adds the horizontal and vertical contour emphasis signals to the output of said calculating and processing means.

4. An image pickup apparatus according to claim 1, further comprising chrominance signal generating means for generating a chrominance signal by processing each pixel data of the image data in a predetermined order.

5. An image pickup apparatus according to claim 4, wherein said chrominance signal generating means generates a chrominance signal for an odd field by adding the image data at an odd line to the next even line and generates a chrominance signal for an even field by adding the image data at an even line to the image data at the next odd line.

6. An image pickup apparatus according to claim 5, wherein the color filters are complementary color filters disposed in a manner of checkerboard layout.

7. A storage medium storing code for performing a processing method used in an image pickup apparatus comprising image pickup means, driving means for reading out image data from image data obtained by said image pickup means, by a first reading method and a second reading method different from the first reading method, and signal processing means for inputting the image data read out respectively by the first reading method and the second reading method, generating a luminance signal on the basis of the image data read out by the first reading method, and generating a chrominance signal on the basis of the image data read out by the second reading method, said processing method comprising a step of forming image data of a single image of a subject synthesized from image data of first and second images of the subject picked up with said image pickup means attached with color filters whose relative position to the image of the subject being controlled to be shifted by an amount of one pixel in the horizontal direction when the second image is picked up.

8. A storage medium according to claim 7, wherein signal charges generated by the image pickup means are read on a frame basis to obtain image data, the image data is stored in a memory, and the image data of the first and second images is synthesized into image data of the single image through addition of the image data in the memory with a different pixel combination.

9. An image pickup apparatus comprising:

image pickup means;

driving means for reading out image data from image data obtained by said image pickup means, by a first reading method and a second reading method different from the first reading method; and signal processing means for inputting the image data read out respectively by the first reading method and the second reading method, generating a luminance signal on the basis of the image data read out by the first reading method, and generating a chrominance signal on the basis of the image data read out by the second reading method.

10. An apparatus according to claim 9, further comprising:

image shifting means for shifting a relative position between said image pickup means and an incident position of an incident light flux to pick up a plurality of images;

a memory for storing the plurality of images picked up by using said image shifting means; and image generating means for generating the chrominance and luminance signals through addition of image data of the plurality of images stored in said memory in predetermined combinations in horizontal and vertical directions.

11. An apparatus according to claim 9, wherein said image pickup means includes color filters, said apparatus further comprising an optical system for focusing an image of a subject onto an image plane of the image pickup means, wherein an image of the subject focused by the optical system is pickup up with the image pickup means, after a first image of the subject is picked up, a relative position between the image pickup means and the image of the subject is shifted by an amount of one pixel in the horizontal direction to pick up the second image of the subject, and the image data of the first and second images are synthesized to obtain image data of a single image.

12. An apparatus according to claim 9, wherein said image pickup means includes color filters, said apparatus further comprising an optical system for focusing an image of a subject onto an image plane of the image pickup means, wherein an image of the subject focused by the optical system is picked up with the image pickup means, after a first image of the subject is picked up, a relative position between the image pickup means and the image of the subject is shifted by an amount of one pixel in the horizontal direction to pick up the second image of the subject, and the image data of the first and second images are synthesized to obtain image data of a single image, wherein:

among a signal processing is performed so that the image data of the first and second images, at least two or more signals are calculated to generate one signal value.

13. An apparatus according to claim 12, wherein the signal calculation includes a plurality of processes capable of being selectively performed.

14. An apparatus according to claim 12, wherein the signal calculation is performed by an addition process.

15. An apparatus according to claim 12, wherein the signal calculation is performed by an averaging process.

16. An apparatus according to claim 12, wherein the signal calculation is performed by a subtraction process.

17. An apparatus according to claim 12, wherein the signal calculation is performed by a calculation process including a realignment process.

18. An apparatus according to claim 9, wherein said image pickup means includes color filters, said apparatus further comprising an optical system for focusing an image of a subject onto an image plane of the image pickup means, wherein an image of the subject focused by the optical system is picked up with the image pickup means, after a first image of the subject is picked up, a relative position between the image pickup means and the image of the subject is shifted by an amount of one pixel in the horizontal direction to pick up the second image of the subject, and the image data of the first and second images are synthesized to obtain image data of a single image, wherein among the image data of the first and second images, a first combination of at least two or more signals are calculated to generate a first signal value and a second combination different from the first combination of at least two or more signals are calculated to generate a second signal value, and wherein a luminance signal is generated by using the first signal value and a chrominance signal is generated by using the second signal value.

19. An apparatus according to claim 18, wherein the signal calculation is performed by an addition process.

20. An apparatus according to claim 18, wherein the signal calculation is performed by an averaging process.

21. An apparatus according to claim 18, wherein the signal calculation is performed by a subtraction process.

22. An apparatus according to claim 18, wherein the signal calculation is performed by a calculation process including a realignment process.

23. An apparatus according to claim 18, wherein the signal calculation includes a plurality of processes capable of being selectively performed.

24. An image pickup method used in an image pickup apparatus comprising image pickup means, driving means for reading out image data from image data obtained by said image pickup means, by a first reading method and a second reading method different from the first reading method, and signal processing means for inputting the image data read out respectively by the first reading method and the second reading method, generating a luminance signal on the basis of the image data read out by the first reading method, and generating a chrominance signal on the basis of the image data read out by the second reading method, said image pickup method comprising the steps of focusing an image of a subject onto an image place of an image pickup element attached with color filters, picking up the focused image of the subject with the image pickup element as a first image of the subject, after the first image of the subject is picked up, shifting a relative position between the image pickup element and the image of the subject by an amount of one pixel in the horizontal direction to pick up a second image of the subject, and synthesizing the image data of the first and second images to obtain image data of a single image.

25. An image pickup method according to claim 24, wherein signal charges generated by the image pickup element are read on a frame basis to obtain image data, the image data is stored in a memory, and the image data of the first and second images are synthesized into image data of the single image through addition of the image data in the memory with a different pixel combination.

* * * * *

UNITED STATES PATENT AND TRADEMARK OFFICE
CERTIFICATE OF CORRECTION

PATENT NO.    : 6,346,999 B1
DATED         : February 12, 2002
INVENTOR(S)   : Udagawa et al.

It is certified that error appears in the above-identified patent and that said Letters Patent is hereby corrected as shown below:

Column 2,
Line 67, "described:" should read -- described. --.

Column 4,
Line 66, "has" should read -- does --; and
Line 67, "took" should read -- take --.

Column 5,
Line 66, "processed" should read -- process --.

Column 6,
Line 38, "processed" should read -- process --.

Column 7,
Lines 36 and 38, "a" should read -- the --.

Column 10,
Line 9, "pickup up" should read -- picked up --; and
Line 29, "among a signal processing is performed so that" should read
-- a signal processing is performed so that among --.

Signed and Sealed this

Twenty-ninth Day of April, 2003

JAMES E. ROGAN
*Director of the United States Patent and Trademark Office*